(12) United States Patent
Kaufmann et al.

(10) Patent No.: US 10,202,128 B2
(45) Date of Patent: Feb. 12, 2019

(54) RETRACTABLE HANDWHEEL GESTURE CONTROL

(71) Applicant: STEERING SOLUTIONS IP HOLDING CORPORATION, Saginaw, MI (US)

(72) Inventors: Timothy W. Kaufmann, Frankenmuth, MI (US); Frank P. Lubischer, Commerce Township, MI (US); Patrik M. Ryne, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 98 days.

(21) Appl. No.: 15/181,887

(22) Filed: Jun. 14, 2016

(65) Prior Publication Data

US 2016/0362117 A1 Dec. 15, 2016

Related U.S. Application Data

(60) Provisional application No. 62/175,777, filed on Jun. 15, 2015.

(51) Int. Cl.
*B60R 11/02* (2006.01)
*B60W 50/10* (2012.01)
(Continued)

(52) U.S. Cl.
CPC ......... *B60W 50/10* (2013.01); *B60R 11/0229* (2013.01); *B62D 1/04* (2013.01); *B62D 1/183* (2013.01); *B62D 15/0285* (2013.01); *G05D 1/021* (2013.01); *B60R 2011/001* (2013.01); *B60W 2540/00* (2013.01)

(58) Field of Classification Search
CPC .............. B60W 50/10; B60W 2540/00; B62D 15/0285; B62D 1/183; B62D 1/04; B60R 11/0229; B60R 2011/001; G05D 1/021; B60K 35/00; B60K 2350/1072; G06F 3/017
See application file for complete search history.

(56) References Cited

U.S. PATENT DOCUMENTS

| 4,315,117 A | 2/1982 | Kokubo et al. |
| 4,337,967 A | 7/1982 | Yoshida et al. |

(Continued)

FOREIGN PATENT DOCUMENTS

| CN | 1722030 A | 1/2006 |
| CN | 1736786 A | 2/2006 |

(Continued)

OTHER PUBLICATIONS

China Patent Application No. 201510204221.5 Second Office Action dated Mar. 10, 2017, 8 pages.

(Continued)

*Primary Examiner* — Michael J Zanelli
(74) *Attorney, Agent, or Firm* — Cantor Colburn LLP

(57) ABSTRACT

An embodiment of a control system includes a sensing element configured to detect a gesture from at least one user in a vehicle including a handwheel, and a gesture control module configured to receive gesture information from the sensing element and control at least one of the handwheel and the vehicle based on the gesture information.

20 Claims, 4 Drawing Sheets

(51) Int. Cl.
  *B62D 1/04* (2006.01)
  *B62D 1/183* (2006.01)
  *G05D 1/02* (2006.01)
  *B62D 15/02* (2006.01)
  *B60R 11/00* (2006.01)

(56) References Cited

U.S. PATENT DOCUMENTS

| | | |
|---|---|---|
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |
| 5,469,356 A | 11/1995 | Hawkins et al. |
| 5,488,555 A | 1/1996 | Asgari et al. |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,138,788 A | 10/2000 | Bohner et al. |
| 6,170,862 B1 | 1/2001 | Hoagland et al. |
| 6,212,453 B1 | 4/2001 | Kawagoe et al. |
| 6,227,571 B1 | 5/2001 | Sheng et al. |
| 6,256,561 B1 | 7/2001 | Asanuma |
| 6,301,534 B1 | 10/2001 | McDermott, Jr. et al. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,481,526 B1 | 11/2002 | Millsap et al. |
| 6,575,263 B2 | 6/2003 | Hjelsand et al. |
| 6,578,449 B1 | 6/2003 | Anspaugh et al. |
| 6,598,695 B1 | 7/2003 | Menjak et al. |
| 6,612,392 B2 | 9/2003 | Park et al. |
| 6,612,393 B2 | 9/2003 | Bohner et al. |
| 6,778,890 B2 | 8/2004 | Shimakage et al. |
| 6,799,654 B2 | 10/2004 | Menjak et al. |
| 6,817,437 B2 | 11/2004 | Magnus et al. |
| 6,819,990 B2 | 11/2004 | Ichinose |
| 6,820,713 B2 | 11/2004 | Menjak et al. |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,150,581 B2 | 4/2012 | Iwazaki et al. |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,452,492 B2 | 5/2013 | Buerkle et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,632,096 B1 | 1/2014 | Quinn et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,725,230 B2 | 5/2014 | Lisseman et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,915,164 B2 | 12/2014 | Moriyama |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,150,238 B2 | 10/2015 | Alcazar et al. |
| 9,159,221 B1 | 10/2015 | Stantchev |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,315,210 B2 | 4/2016 | Sears et al. |
| 9,333,983 B2 | 5/2016 | Lathrop et al. |
| 9,360,865 B2 | 6/2016 | Yopp |
| 9,714,036 B2 | 7/2017 | Yamaoka et al. |
| 9,725,098 B2 * | 8/2017 | Abou-Nasr ........... B60W 50/10 |
| 9,810,727 B2 | 11/2017 | Kandler et al. |
| 9,852,752 B1 | 12/2017 | Chou et al. |
| 9,868,449 B1 * | 1/2018 | Holz .................... B60W 50/10 |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0182640 A1 | 9/2004 | Katou et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0155809 A1 | 7/2005 | Krzesicki et al. |
| 2005/0197746 A1 | 9/2005 | Pelchen et al. |
| 2005/0275205 A1 | 12/2005 | Ahnafield |
| 2006/0224287 A1 | 10/2006 | Izawa et al. |
| 2006/0244251 A1 | 11/2006 | Muller |

(56) References Cited

U.S. PATENT DOCUMENTS

| | | |
|---|---|---|
| 2006/0271348 A1 | 11/2006 | Rossow et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2009/0024278 A1 | 1/2009 | Kondo et al. |
| 2009/0189373 A1* | 7/2009 | Schramm ............... B60K 35/00 280/731 |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0250081 A1 | 9/2010 | Kinser et al. |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0150388 A1 | 6/2012 | Boissonnier et al. |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0152551 A1* | 6/2014 | Mueller ............... G06F 3/017 345/156 |
| 2014/0156107 A1 | 6/2014 | Karasawa et al. |
| 2014/0168061 A1* | 6/2014 | Kim ............... G06F 3/017 345/156 |
| 2014/0172231 A1* | 6/2014 | Terada ............... G06F 3/005 701/36 |
| 2014/0277896 A1 | 9/2014 | Lathrop et al. |
| 2014/0277945 A1 | 9/2014 | Chandy |
| 2014/0300479 A1 | 10/2014 | Wolter et al. |
| 2014/0303827 A1 | 10/2014 | Dolgov et al. |
| 2014/0309816 A1 | 10/2014 | Stefan et al. |
| 2014/0354568 A1 | 12/2014 | Andrews et al. |
| 2015/0002404 A1 | 1/2015 | Hooton |
| 2015/0006033 A1 | 1/2015 | Sekiya |
| 2015/0014086 A1 | 1/2015 | Eisenbarth |
| 2015/0032322 A1 | 1/2015 | Wimmer |
| 2015/0032334 A1 | 1/2015 | Jang |
| 2015/0051780 A1 | 2/2015 | Hahne |
| 2015/0060185 A1 | 3/2015 | Feguri |
| 2015/0120124 A1 | 4/2015 | Bartels et al. |
| 2015/0120141 A1 | 4/2015 | Lavoie et al. |
| 2015/0120142 A1 | 4/2015 | Park et al. |
| 2015/0123947 A1* | 5/2015 | Jubner ............... B62D 1/046 345/175 |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2015/0338849 A1 | 11/2015 | Nemec et al. |
| 2016/0001781 A1 | 1/2016 | Fung et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207536 A1 | 7/2016 | Yamaoka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0244070 A1 | 8/2016 | Bendewald et al. |
| 2016/0291862 A1 | 10/2016 | Yaron et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0355207 A1 | 12/2016 | Urushibata |
| 2016/0362084 A1 | 12/2016 | Martin et al. |
| 2016/0362126 A1 | 12/2016 | Lubischer |
| 2016/0364003 A1* | 12/2016 | O'Brien ............... G06F 3/017 |
| 2016/0368522 A1 | 12/2016 | Lubischer |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0101032 A1 | 4/2017 | Sugioka et al. |
| 2017/0113712 A1 | 4/2017 | Watz |
| 2017/0151950 A1 | 6/2017 | Lien |
| 2017/0151978 A1 | 6/2017 | Oya et al. |
| 2017/0158055 A1 | 6/2017 | Kim et al. |
| 2017/0158222 A1 | 6/2017 | Schulz et al. |
| 2017/0166222 A1 | 6/2017 | James |
| 2017/0225704 A1 | 8/2017 | Urushibata |
| 2017/0240204 A1 | 8/2017 | Raad et al. |
| 2017/0242428 A1 | 8/2017 | Pal et al. |
| 2017/0293306 A1 | 10/2017 | Riefe et al. |
| 2017/0297606 A1 | 10/2017 | Kim et al. |
| 2017/0305425 A1 | 10/2017 | Xing |
| 2017/0305458 A1 | 10/2017 | Wang et al. |
| 2017/0334458 A1 | 11/2017 | Sato et al. |
| 2018/0017963 A1 | 1/2018 | Zhu et al. |
| 2018/0029632 A1 | 2/2018 | Bodtker et al. |
| 2018/0059661 A1 | 3/2018 | Sato et al. |
| 2018/0059662 A1 | 3/2018 | Sato et al. |
| 2018/0072341 A1 | 3/2018 | Schulz et al. |
| 2018/0093700 A1 | 4/2018 | Chandy |
| 2018/0105198 A1 | 4/2018 | Bodtker et al. |
| 2018/0107214 A1 | 4/2018 | Chandy |
| 2018/0136727 A1 | 5/2018 | Chandy |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102320324 A | 1/2012 |
| CN | 102452391 A | 5/2012 |
| CN | 202563346 U | 11/2012 |
| CN | 103158699 A | 6/2013 |
| CN | 103419840 A2 | 12/2013 |
| CN | 103448785 A | 12/2013 |
| CN | 103677253 | 3/2014 |
| CN | 104024084 | 9/2014 |
| DE | 19523214 A1 | 1/1997 |
| DE | 19923012 A1 | 11/2000 |
| DE | 10212782 A1 | 10/2003 |
| DE | 102005032528 A1 | 1/2007 |

(56) References Cited

FOREIGN PATENT DOCUMENTS

| | | |
|---|---|---|
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102012010887 A1 | 12/2013 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 A | 8/1985 |
| JP | S60164629 A | 8/1985 |
| JP | H05162652 A | 6/1993 |
| JP | 2007253809 A | 10/2007 |
| JP | 20174099 A | 1/2017 |
| KR | 20100063433 A | 6/2010 |
| WO | 2006099483 A1 | 9/2006 |
| WO | 2007034567 A1 | 3/2007 |
| WO | 2010082394 A1 | 7/2010 |
| WO | 2010116518 A1 | 10/2010 |
| WO | 2013080774 A1 | 6/2013 |
| WO | 2013101058 A1 | 7/2013 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Enginers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
Chinese First Office Action and Search Report dated Dec. 20, 2017 cited in Application No. 2016103666609.X, (w/ English language translation), 16 pgs.
Chinese First Office Action dated Jan. 22, 2018 cited in Application No. 201610575225.9, (w/ English language translation), 16 pgs.
Chinese Office Action and Search Report dated Mar. 22, 2018 cited in Application No. 201610832736.4, (w/ English language translation) 12 pgs.
Chinese Office Action and Search Report from the Chinese Patent Office for CN Application No. 201610575225.9 dated Oct. 16, 2018, 19 pages, English Translation Included.
Chinese Office Action from the Chinese Patent Office for CN Application No. 2017102318205 dated Oct. 12, 2018, 7 pages, English Translation Only.
Chinese Office Action from the CN Patent Office for CN Application No. 201610832736.4 dated Oct. 16, 2018, 18 pages, English Translation Included.

\* cited by examiner

RETRACTABLE HANDWHEEL GESTURE CONTROL

CROSS-REFERENCES TO RELATED APPLICATIONS

This patent application claims priority to U.S. Provisional Patent Application Ser. No. 62/175,777, filed Jun. 15, 2015 which is incorporated herein by reference in its entirety.

BACKGROUND OF THE INVENTION

Retractable and/or stowable handwheels may be available with the introduction of automated driver assistance systems (ADAS) and autonomous vehicle systems. Drivers may want a handwheel to be retracted or moved (e.g., upon request) in situations such as when a vehicle is in an autonomous mode. The handwheel may also be brought into a standard driving position when the driver wishes to steer the vehicle.

SUMMARY OF THE INVENTION

In accordance with one aspect of the invention, an embodiment of a control system includes a sensing element configured to detect a gesture from at least one user in a vehicle including a handwheel, and a gesture control module configured to receive gesture information from the sensing element and control at least one of the handwheel and the vehicle based on the gesture information.

In accordance with another aspect of the invention, an embodiment of a method of controlling an aspect of a vehicle includes detecting, by a sensing element, a gesture from at least one user in a vehicle including a handwheel, receiving gesture information from the sensing element by a gesture control module, and controlling at least one of the handwheel and the vehicle based on the gesture information.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
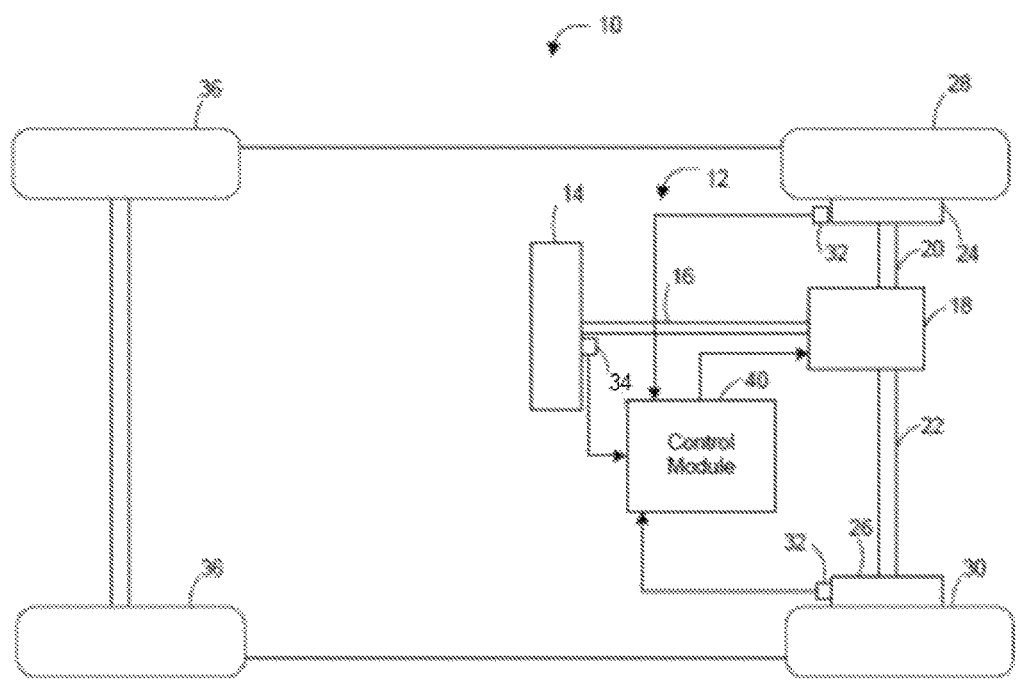
FIG. 1 depicts aspects of a vehicle and vehicle steering assist and/or control system.

Referring now to FIG. 1, where the invention will be described with reference to specific embodiments without limiting same, an exemplary embodiment of a vehicle 10 including a steering system 12 such as an electrical power steering (EPS) system, an automated driver assist system and/or an automated vehicle control system is illustrated. In various embodiments, the steering system 12 includes a handwheel 14 coupled to a steering shaft 16. In the exemplary embodiment shown, the steering system 12 is an electric power steering (EPS) system and/or automated driver assist system that further includes a steering assist unit 18 that couples to the steering shaft 16 of the steering system 12 and to tie rods 20, 22 of the vehicle 10. The steering assist unit 18 includes, for example, a steering actuator motor (e.g., electrical motor) and a rack and pinion steering mechanism (not shown) that may be coupled through the steering shaft 16 to the steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10. In one embodiment, the steering assist unit 18 can autonomously control steering using the actuator motor, for example, for parking assist or autonomous driving.

It is noted that the embodiments described herein are not limited to the steering system shown in FIG. 1, and may be used in conjunction with any suitable steering or control system. Examples of control systems that can be used with the embodiments described herein include Active Front Steering (AFS) systems and hydraulic steering systems. Other control systems that can be used with the embodiments include systems configured to control vehicle functions without a handwheel. An example of such a system is a by-wire system such as a Drive by Wire, Steer by Wire or X-by-Wire system.

In one embodiment, the handwheel 14 is moveable to allow a controller and/or user to move the handwheel 14 between various positions. For example, the handwheel 14 may be moveable to one or more positions at which a driver can operate the handwheel 14 and steer the vehicle (referred to as "driving positions"). The handwheel 14 may also be retracted or moved to a stowed position (e.g., during autonomous operation). The handwheel 14 can be moved using a variety of mechanisms, such as a hinged or pivoting portion of the steering shaft 16, a telescoping or retractable portion of the steering shaft 16, or any other suitable mechanism.

As shown in FIG. 1, the vehicle 10 further includes various sensors that detect and measure observable conditions of the steering system 12 and/or of the vehicle 10. The sensors generate sensor signals based on the observable conditions. In the example shown, sensors 32 are wheel speed sensors that sense a rotational speed of the wheels 28 and 30, respectively. The sensors 32 generate wheel speed signals based thereon. In other examples, other wheel speed sensors can be provided in addition to or alternative to the sensors 32. The other wheel speed sensors may sense a rotational speed of rear wheels 36 and generate sensor signals based thereon. As can be appreciated, other wheel sensors that sense wheel movement, such as wheel position sensors, may be used in place of the wheel speed sensors. In such a case, a wheel velocity and/or vehicle velocity or speed may be calculated based on the wheel sensor signal.

The vehicle also includes sensors for detecting the position and/or movement of the handwheel 16. In one embodiment, the handwheel includes a torque sensor and/or position sensor (collectively referred to as handwheel sensor 34). The handwheel sensor 34 can sense a torque placed on the handwheel 14 and/or sense the angular position of the handwheel 14. Other sensors include sensors for detecting the position (motor position) and rotational speed (motor velocity or motor speed) of the steering actuator motor or other motor associated with the steering assist unit 18.

A control module 40 controls the operation of the steering system 12 based on one or more sensor signals and further based on the steering control systems and methods of the present disclosure. The control module may be used as part of an EPS system to provide steering assist torque and/or may be used as a driver assistance system that can control steering of the vehicle (e.g., for parking assist, emergency steering control and/or autonomous or semi-autonomous steering control). An example of a driver assistance system is an ADAS (Advanced Driver Assistance Systems) system that, instead of or in addition to directly assisting the driver (by reducing steering efforts), can also accept a position command from another control system to achieve directional control of a vehicle in certain conditions.

Generally speaking, the steering control systems and methods of the present disclosure can be used to control the position of a handwheel or steering wheel and/or provide directional control of a vehicle (either autonomously, semi-autonomously or by providing torque or steering assist) based on one or more gestures performed by a user (e.g., driver or passenger). The control module 40 or other suitable processing device or system senses user gestures and performs various control actions. In one embodiment, the control module responds to appropriate gestures to move the handwheel 14 between one or more driving positions and/or between a driving position and a retracted or stowed position. The control module 40 may also respond to gestures to control steering of the vehicle to allow a user to control the vehicle without physically engaging the handwheel 14.

Aspects of embodiments described herein may be performed by any suitable control system and/or processing device, such as the steering assist unit 18 and/or the control module 40. In one embodiment, the control module 40 is or is included as part of an autonomous driving system.

Figure 2:
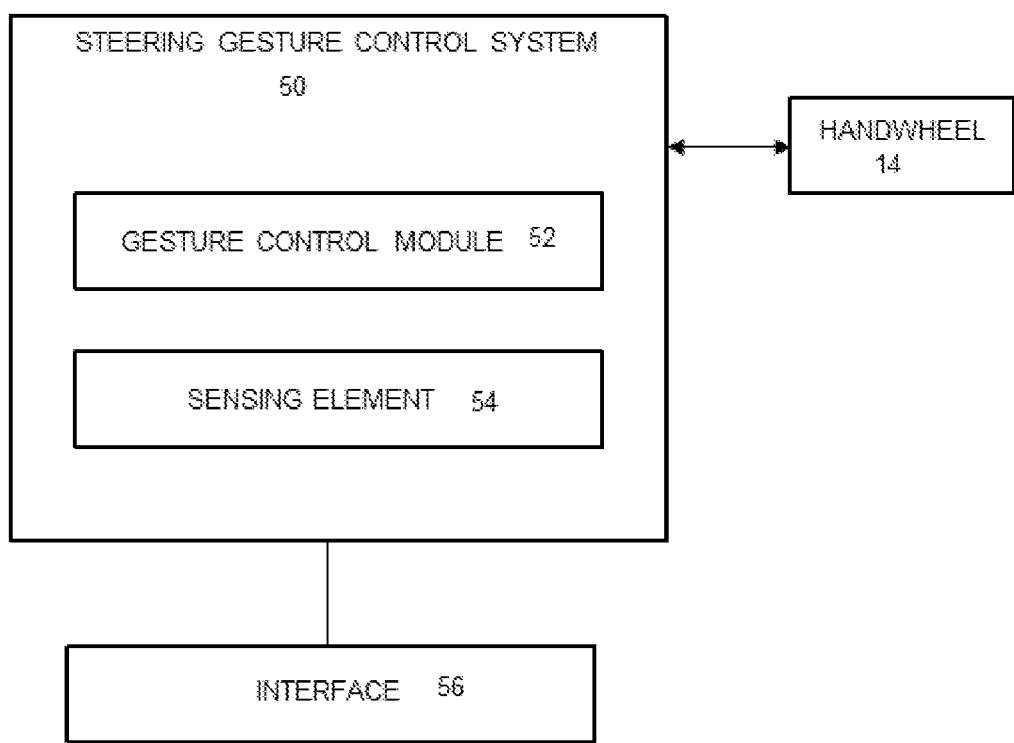
FIG. 2 depicts a steering gesture control system in accordance with one aspect of the invention.

FIG. 2 shows an embodiment of a control system 50 that includes a gesture control module 52 and a sensing element 54. The control system 50 is configured to control aspects of a vehicle such as vehicle speed, vehicle steering and/or positioning of a handwheel. The control system 50 also includes an interface 56 that includes a display that provides control information to a user. The control system 50 may be incorporated as part of the control module 40 or any other suitable component of a vehicle. In addition, aspects of the control system 50 can be incorporated into a device or system that is separate from the vehicle, such as a smartphone or other portable device, which can communicate with the vehicle (e.g., by a plug-in connection or wireless connection).

The gesture control module 52 may control steering and/or handwheel functions, such as the function of retracting the handwheel 14 to a retracted or stowed position, redeployment of the handwheel 14 to a driving position, and moving the handwheel 14 between multiple driving positions. For example, a wave with both hands of a driver with palms toward the dash (or other location of the sensing element 54) may indicate to the control system 50 to retract the handwheel 14. Similarly, a driver may wave both hands toward the dash (or other location of the sensing element 54) to deploy the handwheel 14 into the driving position (e.g. by waving with both hands). The sensing element 54 is positioned so as to view the driver's hand or hands. The sensing element 54 may be a video camera, light sensor, motion sensor or other type of sensor sufficient to recognize driver gestures. A location for the camera may be in the center of the handwheel 14, or to one or more sides of an interface 54 located on the dashboard or on the center of the handwheel 14, although the location is not limited to any specific embodiments described herein.

As described herein, a "gesture" refers to any movement by a user, driver or operator that can be recognized by the gesture control module 52 and used to control an aspect of a handwheel and/or vehicle. Gestures may include directional gestures, waves, hand signals and others, and can correspond to a command such as a steering command or a handwheel position control command, e.g., to retract or stow the handwheel, return the handwheel to a driving position and/or move the handwheel to different driving positions. The number and type of gestures recognized by the gesture control module may be pre-selected (e.g., default) or customizable based on user input.

In one embodiment, the interface 56 includes a display area such as a two-dimensional screen display and/or a three-dimensional holographic display. The display may be positioned at any suitable location, such as at the dashboard or at the handwheel 14. For example, once the handwheel 14 is retracted, an area that the handwheel 14 has vacated may include use for a holographic display area for other gesture functions or entertainment. For gesture functions, a driver could passively page through a menu of vehicle functions by waving a hand left or right within a range of the sensing element 56, for example. A driver could also raise both hands palms up to indicate a change request (e.g. increasing the volume of the audio system) within a range of the sensing element 56. Similarly, to lower the volume, the driver may lower both hands, palms down.

In one embodiment, the display is disposed at a central location or other location on the handwheel that is visible to a user. For example, the display is located on the center hub of the handwheel 14. The center hub may be a stationary hub (i.e., the hub does not rotate when the handwheel is rotated) or the center hub may rotate with the handwheel 14. If the center hub rotates with the handwheel 14, the display could be positioned or configured so that the best viewing would be when the handwheel 14 is stationary. In another example, if the handwheel 14 is stowable, the display can be located so that the best viewing would be when the handwheel 14 is stowed. The display may be located in the dash of the vehicle, e.g., if the handwheel 14 is completely stowed in the dash, so that an unobstructed view of the display area is ensured.

Figure 3:
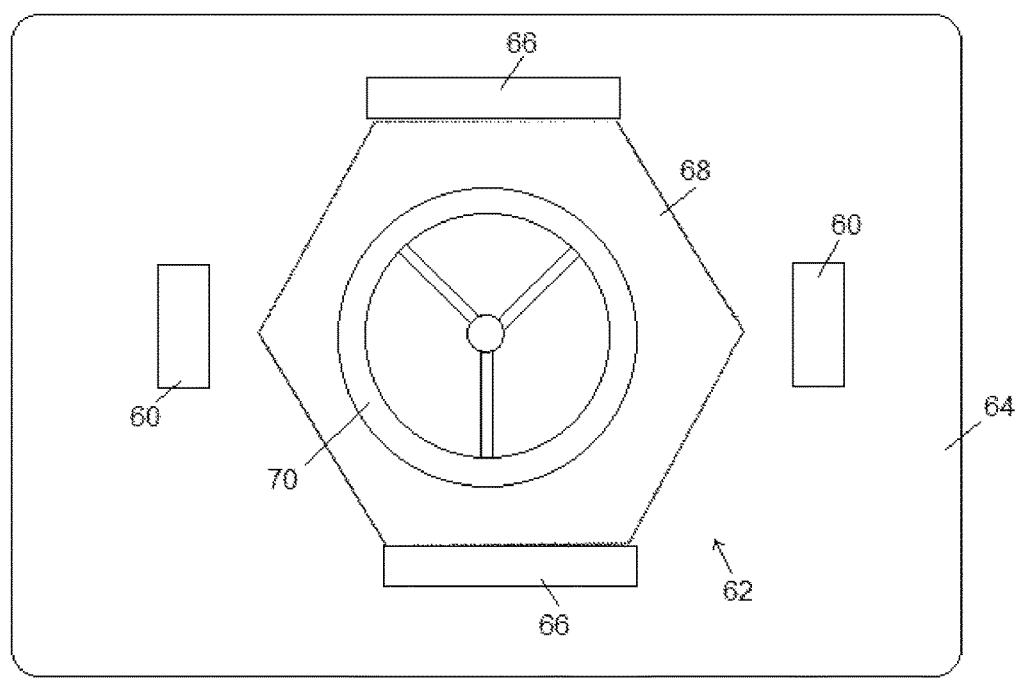
FIG. 3 depicts an embodiment of a three-dimensional holographic display and aspects of a steering gesture control system.

Various gestures can be used to steer the vehicle via a holographic or virtual steering wheel. An example of a three-dimensional holographic display is shown in FIG. 3. The control system 50 includes sensing elements in the form of cameras 60 located on either side of an interface, which in this example is a holographic display 62. The cameras 60 and/or holographic display 62 may be positioned at any suitable location in the vehicle. For example, the cameras and/or the display 62 are positioned on a panel 64 that may be lowered or positioned over the handwheel 14 when the handwheel 14 is in the stowed position.

In the embodiment of FIG. 3, the holographic display 62 includes illumination sources 66 and a display screen 68 that project a holographic image 70 above the screen 68 or otherwise in view of the user. The holographic display 62 may be of any suitable type and is not limited to the embodiments described herein.

An example of the holographic image 70 is an image of a steering wheel (a "virtual steering wheel"). The virtual steering wheel can be projected and hand motions around the virtual steering wheel can be tracked to provide steering signals to the vehicle. This can be used in a retracted mode or give the opportunity to remove the actual steering wheel completely. Gestures can also provide optional placement of the virtual steering wheel in the vehicle if multiple cameras are installed. Finally, the physical steering wheel may be replaced with a holographic steering wheel and the holographic steering wheel may be controlled with gestures in a manner described herein.

Figure 4:
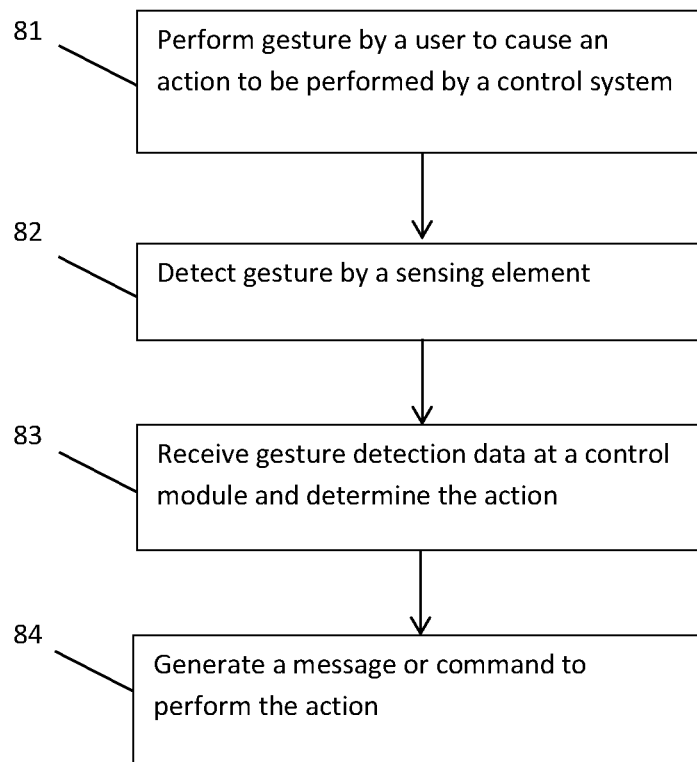
FIG. 4 is a flow diagram depicting a method of controlling a handwheel and/or a vehicle based on gesture recognition.

FIG. 4 illustrates a method 80 of controlling a handwheel and/or a vehicle based on gesture recognition. The method 80 is used in conjunction with the system 10 and/or the control system 50, although the method 80 may be utilized in conjunction with any suitable combination of sensing devices and processors. The method 80 includes one or more stages 81-84. In one embodiment, the method 80 includes the execution of all of stages 81-84 in the order described. However, certain stages may be omitted, stages may be added, or the order of the stages changed.

In the first stage 81, a user (e.g., a driver or passenger) performs a gesture, such as a hand wave or a display of a hand or hands in a selected configuration. The gesture is performed by the user to cause an action to be performed by a control system such as the control system 50.

In the second stage 82, the gesture is detected by a sensing element, such as a video camera.

In the third stage 83, the gesture control module receives gesture detection data from the sensing element and determines the action to be performed based on the gesture. Examples of actions include retracting the handwheel to a retracted or stowed position, moving the handwheel from the retracted or stowed position to a driving position, and moving the handwheel between different driving positions. Other examples include controlling other vehicle systems, such as video, display options, radio station and volume, wipers, etc. Further examples of actions include vehicle control actions such as steering the vehicle.

In the fourth stage 84, the gesture control module generates a message or command to perform the action. For example, the gesture control module sends a command to an appropriate vehicle system or component to realize the action. For example, if the gesture is for moving the handwheel, the gesture control module sends a command to operate an internal motor to move the handwheel. If the gesture is to steer the vehicle (e.g., in conjunction with a holographic image of the handwheel), the gesture control module sends a command to a motor (e.g., in the steering assist unit 18) or sends a command to a steering assist or control system (e.g., the control module 40).

Embodiments described herein provide numerous advantages. The control systems described herein can allow a user to position a handwheel and/or steer a vehicle without requiring the use of buttons or other mechanical devices. This is advantageous over processes that retract the handwheel by pressing a button or grabbing the handwheel and moving it to a desired location. Such processes can present challenges as they may require the user to search for the button, which adds to driver work load and may force the driver's attention off the road. The button may also take up dashboard space, and the act of grabbing the handwheel and moving the handwheel could be difficult for the driver. Embodiments described herein address such challenges and can increase driver safety.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system comprising:
   a panel comprising a sensing element and an interface, the sensing element configured to detect a gesture from at least one user in a vehicle including a handwheel, and the interface configured to display information related to control of at least one of the handwheel and the vehicle; and
   a gesture control module configured to receive gesture information from the sensing element and control at least one of the handwheel and the vehicle based on the gesture information, the gesture being performed to cause the gesture control module to move the handwheel between a driving position and a retracted or stowed position.

2. The system of claim 1, wherein the gesture is performed to cause the gesture control module to steer the vehicle.

3. The system of claim 1, wherein the interface is configured to generate a holographic image, the holographic image configured to be interacted with by the user to control at least one of the handwheel and the vehicle.

4. The system of claim 3, wherein the holographic image is an image of the handwheel.

5. The system of claim 3, wherein the sensing element is configured to detect the gesture in relation to the holographic image and steer the vehicle based on the gesture.

6. The system of claim 1, wherein the sensing element includes a camera configured to record the gesture.

7. The system of claim 1, wherein the interface is disposed at a center hub of the handwheel.

8. The system of claim 1, wherein the interface is disposed at a location in the vehicle that is available to the user upon stowing the handwheel.

9. The system of claim 1, wherein the panel is positioned over the handwheel when the handwheel is in the retracted or stowed position.

10. A method of controlling an aspect of a vehicle, comprising:
    detecting, by a sensing element, a first gesture from at least one user in a vehicle including a handwheel;
    receiving first gesture information from the sensing element by a gesture control module;
    controlling at least one of the handwheel and the vehicle based on the first gesture information, the first gesture being performed to cause the gesture control module to move the handwheel from a driving position to a retracted or stowed position;
    detecting, by the sensing element, a second gesture from the at least one user in the vehicle;
    receiving second gesture information from the sensing element by the gesture control module; and
    controlling at least one of the handwheel and the vehicle based on the second gesture information, the second gesture being performed to cause the gesture control module to move the handwheel from the retracted or stowed position to the driving position, the first gesture and the second gesture being the same gesture.

11. The method of claim 10, wherein one of the first gesture and the second gesture is performed to cause the gesture control module to steer the vehicle.

12. The method of claim 10, wherein the sensing element is connected to an interface configured to display information related to control of at least one of the handwheel and the vehicle.

13. The method of claim 12, wherein the interface is configured to generate a holographic image, the holographic image configured to be interacted with by the user to control at least one of the handwheel and the vehicle.

14. The method of claim 13, wherein the holographic image is configured to be displayed when the handwheel is in a stowed position and interacted with by the user to steer the vehicle.

15. The method of claim 13, wherein the sensing element is configured to detect at least one of the first gesture and the second gesture in relation to the holographic image and steer the vehicle based on the at least one of the first gesture and the second gesture.

16. The method of claim 12, wherein the interface is disposed at a center hub of the handwheel.

17. The method of claim 12, wherein the interface is disposed at a location in the vehicle that is available to the user upon stowing the handwheel.

18. The method of claim 10, wherein the sensing element includes a camera configured to record the first gesture and the second gesture.

19. The method of claim 10, wherein the first gesture and the second gesture comprise a user waving both hands of the user with palms toward the sensing element.

20. A control system comprising:
a sensing element configured to detect a gesture from at least one user in a vehicle including a handwheel, the sensing element being disposed at a center hub of the handwheel;
an interface configured to display information related to control of at least one of the handwheel and the vehicle, the interface being disposed at the center hub of the handwheel; and
a gesture control module configured to receive gesture information from the sensing element and control at least one of the handwheel and the vehicle based on the gesture information, the gesture being performed to cause the gesture control module to move the handwheel between a driving position and a retracted or stowed position.

* * * * *